United States Patent Office 3,395,167
Patented July 30, 1968

3,395,167
PREPARATION OF SILALACTONES
John C. Saam, Midland, Mich., assignor to Dow Corning Corporation, Midland, Mich., a corporation of Michigan
No Drawing. Filed June 14, 1965, Ser. No. 463,944
1 Claim. (Cl. 260—448.2)

ABSTRACT OF THE DISCLOSURE

Silalactones are prepared by heating halosilyl carboxylic acid alkyl esters at a temperature of at least 150° C. The lactones are useful as chemical intermediates in the preparation of silyl esters and amides. A typical example is

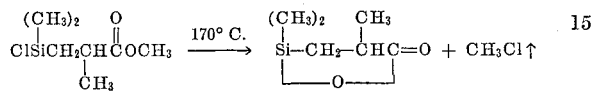

This application relates to a new method of preparing silalactones, which are useful as chemical intermediates in the preparation of silyl esters and amides.

The invention of this application resides in the process of preparing an organosilicon compound of the formula

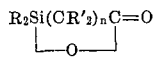

comprising heating at a temperature of at least 150° C. an organosilicon compound of the formula

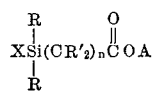

where each R is selected from the group consisting of alkyl, cycloalkyl, alkaryl, and aryl radicals, each R' is selected from the group consisting of hydrogen and lower alky radicals, A is a lower alkyl radical, X is selected from the group consisting of chlorine, bromine, and iodine, and $n$ has a value of 2 through 5.

R can be any alkyl or cycloalkyl radical such as methyl, ethyl, isopropyl, 2-ethylhexyl, dodecyl, or cyclopentyl; any aryl radical such as phenyl or xenyl, or any alkaryl radical such as tolyl or ethylphenyl. R' and A can each be any lower alkyl radical such as methyl, ethyl, propyl, isobutyl, or sec-hexyl.

The reaction used in this invention proceeds at a measurable rate at any temperature from about 150° C. to the decomposition temperature of the reactant and product. It is preferred for a temperature of 165° to 250° C. to be used.

The reaction is as follows:

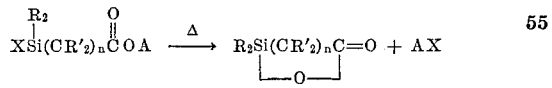

The reaction can be driven to completion by permitting the AX byproduct, which is typically methyl chloride, ethyl bromide, etc., to volatilize and escape while the other materials present are retained in the reaction vessel.

It is desirable to operate the reaction in an inert atmosphere.

The following examples are illustrative only and should not be construed as limiting the invention, which is properly delineated in the appended claims.

Example 1

196 g. of

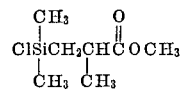

were heated to 170° C. in a nitrogen atmosphere. Evolution of a vapor was noted. The mixture was then refluxed at a temperature of 200° to 220° C. for 24 hours to obtain an 85 percent yield upon distillation of

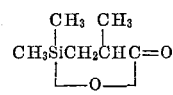

M.P. 80° C., B.P. of the undistilled product: 217° to 230° C.

Methyl chloride was also recovered from a cold trap after the reaction.

Example 2

When 10 g. of

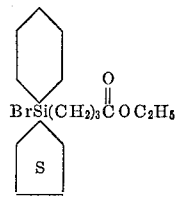

are heated at 200° C. The product

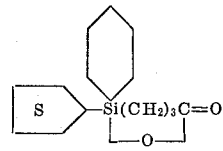

is formed.

Example 3

When 20 g. of

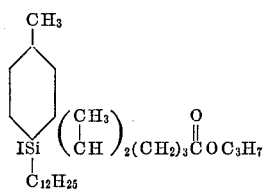

are heated at 180° C., the product

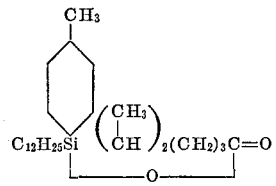

is formed.

That which is claimed is:
1. The process of preparing an organosilicon compound of the formula

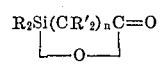

comprising heating at a temperature of at least 150° C. an organosilicon compound of the formula

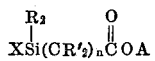

where each R is selected from the group consisting of alkyl, cycloalkyl, alkaryl, and aryl radicals, each R' is selected from the group consisting of hydrogen and lower alkyl radicals, A is a lower alkyl radical, X is selected from the group consisting of chlorine, bromine and iodine, and $n$ has a value of 2 through 5.

References Cited
UNITED STATES PATENTS

| | | | |
|---|---|---|---|
| 2,635,109 | 4/1953 | Sommer | 260—448.2 |
| 2,589,446 | 3/1952 | Sommer | 260—448.2 |
| 2,963,500 | 12/1960 | Sommer | 260—448.2 |

TOBIAS E. LEVOW, *Primary Examiner.*

J. P. PODGORSKI, *Assistant Examiner.*